United States Patent
Lopac et al.

(10) Patent No.: US 11,890,697 B1
(45) Date of Patent: Feb. 6, 2024

(54) SYSTEM AND METHOD OF ADDITIVE MANUFACTURING

(71) Applicant: Rosemount Aerospace Inc., Burnsville, MN (US)

(72) Inventors: Mark Stephen Lopac, Cokato, MN (US); Ryan Chou, Richfield, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 29 days.

(21) Appl. No.: 17/506,031

(22) Filed: Oct. 20, 2021

Related U.S. Application Data

(62) Division of application No. 16/032,955, filed on Jul. 11, 2018, now Pat. No. 11,179,808.

(51) Int. Cl.
| | |
|---|---|
| *B23K 26/342* | (2014.01) |
| *B23K 26/08* | (2014.01) |
| *B23K 26/12* | (2014.01) |
| *B23K 26/70* | (2014.01) |
| *B33Y 10/00* | (2015.01) |
| *B33Y 30/00* | (2015.01) |

(52) U.S. Cl.
CPC ........ *B23K 26/342* (2015.10); *B23K 26/0869* (2013.01); *B23K 26/123* (2013.01); *B23K 26/126* (2013.01); *B23K 26/128* (2013.01); *B23K 26/702* (2015.10); *B33Y 10/00* (2014.12); *B33Y 30/00* (2014.12)

(58) Field of Classification Search
CPC ............... B23K 26/342; B23K 26/702; B23K 26/0869; B23K 26/123; B23K 26/126; B23K 26/128; B33Y 10/00; B33Y 30/00
USPC ........................................................ 219/76.1
See application file for complete search history.

(56) References Cited

U.S. PATENT DOCUMENTS

| | | | | |
|---|---|---|---|---|
| 4,627,717 A | * | 12/1986 | Thompson | ......... G03G 21/0047 399/356 |
| 6,033,850 A | * | 3/2000 | Purvis | ...................... C12Q 1/68 435/6.12 |
| 6,680,456 B2 | * | 1/2004 | Adams | ................. B23K 10/027 219/121.48 |
| 7,236,166 B2 | * | 6/2007 | Zinniel | ................... B33Y 30/00 264/340 |
| 8,488,994 B2 | * | 7/2013 | Hanson | ................... B33Y 10/00 399/130 |
| 8,718,522 B2 | * | 5/2014 | Chillscyzn | ............ B29C 64/141 353/121 |

(Continued)

FOREIGN PATENT DOCUMENTS

WO    2015051175 A2    4/2015

*Primary Examiner* — Eric S Stapleton
(74) *Attorney, Agent, or Firm* — Kinney & Lange, P.A.

(57) ABSTRACT

A method is disclosed for additive manufacturing a three-dimensional object layer-by-layer including depositing a layer of material on a bed surface or a previously deposited layer of the object to form the object layer-by-layer; providing energy to the material after each layer is deposited with the energy being provided by an energy source that forms an energized beam directed at the material; altering a property of a gas surrounding the material and through which the energized beam extends to alter a property of the object constructed from the material; melting the material with the energized beam to form a melted pool of liquefied material; and allowing the material to solidify to bond the material to a previous layer of material of the object.

10 Claims, 2 Drawing Sheets

(56) References Cited

U.S. PATENT DOCUMENTS

| | | | |
|---|---|---|---|
| 8,747,956 B2 | 6/2014 | Kennedy et al. | |
| 8,879,957 B2* | 11/2014 | Hanson | B33Y 10/00 399/130 |
| 9,346,127 B2* | 5/2016 | Buller | B23K 15/0026 |
| 9,821,399 B1* | 11/2017 | Vigdal | B65H 57/26 |
| 10,105,902 B2 | 10/2018 | Frauens | |
| 10,682,703 B2 | 6/2020 | Shafir | |
| 10,967,460 B2* | 4/2021 | Colin | B22F 10/25 |
| 2002/0145213 A1 | 10/2002 | Liu | B29C 64/40 700/118 |
| 2003/0209836 A1 | 11/2003 | Sherwood | B33Y 50/02 425/130 |
| 2005/0092929 A1* | 5/2005 | Schneiker | H01J 1/304 250/396 R |
| 2006/0219760 A1* | 10/2006 | Wagoh | B23K 1/0056 228/248.1 |
| 2008/0179298 A1* | 7/2008 | Nakayama | B23K 1/0056 219/85.21 |
| 2009/0101629 A1* | 4/2009 | Adams | B33Y 30/00 219/121.48 |
| 2009/0223939 A1* | 9/2009 | Adams | B23K 10/02 219/121.5 |
| 2010/0021638 A1* | 1/2010 | Varanka | B29C 64/112 427/271 |
| 2010/0193480 A1* | 8/2010 | Adams | B23K 9/23 219/121.15 |
| 2013/0040067 A1* | 2/2013 | Kennedy | B22D 23/003 427/595 |
| 2013/0186549 A1* | 7/2013 | Comb | B29C 65/02 425/90 |
| 2013/0186558 A1* | 7/2013 | Comb | B29C 64/147 156/277 |
| 2015/0021815 A1* | 1/2015 | Albrecht | B22F 10/50 425/162 |
| 2015/0024169 A1* | 1/2015 | Martin | B29C 64/141 264/460 |
| 2015/0165554 A1* | 6/2015 | Voice | B23K 26/34 219/76.1 |
| 2015/0224607 A1* | 8/2015 | Bruck | B23K 35/36 228/56.3 |
| 2015/0321419 A1* | 11/2015 | Linthicum | B29C 64/118 425/375 |
| 2016/0076400 A1* | 3/2016 | Weir | F02C 7/045 264/401 |
| 2016/0199913 A1* | 7/2016 | Mark | B64F 5/00 29/890.043 |
| 2016/0243638 A1* | 8/2016 | Berube | C22C 21/10 |
| 2016/0288264 A1* | 10/2016 | Jones | B22F 10/25 |
| 2017/0165751 A1* | 6/2017 | Buller | B23K 37/06 |
| 2017/0173735 A1* | 6/2017 | Hsu | B23K 9/04 |
| 2017/0182556 A1* | 6/2017 | Ramaswamy | B28B 17/0081 |
| 2017/0203363 A1* | 7/2017 | Rowland | B22F 12/22 |
| 2017/0203364 A1* | 7/2017 | Ramaswamy | B33Y 10/00 |
| 2017/0217089 A1* | 8/2017 | Batchelder | B33Y 50/02 |
| 2017/0256385 A1* | 9/2017 | Paskalova | B33Y 50/02 |
| 2017/0274602 A1* | 9/2017 | Kobayashi | B22F 10/28 |
| 2017/0299973 A1* | 10/2017 | Frauens | B29C 64/188 |
| 2018/0001553 A1* | 1/2018 | Buller | B29C 64/386 |
| 2018/0126650 A1* | 5/2018 | Murphree | B29C 64/25 |
| 2018/0127866 A1* | 5/2018 | Irumata | C04B 35/01 |
| 2018/0133956 A1* | 5/2018 | Buller | B29C 64/357 |
| 2018/0179332 A1* | 6/2018 | Priedeman, Jr. | B29C 64/40 |
| 2018/0269024 A1* | 9/2018 | Nguyen | H01J 37/026 |
| 2018/0326525 A1* | 11/2018 | Ann | B41F 19/005 |
| 2019/0134706 A1* | 5/2019 | Shafir | B22F 12/52 |

* cited by examiner

SYSTEM AND METHOD OF ADDITIVE MANUFACTURING

CROSS-REFERENCE TO RELATED APPLICATION(S)

This application is a divisional of U.S. application Ser. No. 16/032,955 filed Jul. 11, 2018, for "SYSTEM AND METHOD OF ADDITIVE MANUFACTURING" by M. Lopac and R. Chou.

FIELD OF THE INVENTION

The present invention relates to additive manufacturing and, in particular, to an improved system and method for manipulating the additive manufacturing process.

BACKGROUND

Additive manufacturing can be utilized to construct a three-dimensional object. During the additive manufacturing process, the object is constructed layer-by-layer be depositing a material in powder form, using thermal energy to melt the deposited material, and then allowing the melted material to solidify to bond/fuse the material to the previously formed layer(s). The properties of the constructed object can vary depending on various factors, including the material used, the type of gas in the environment in which the process is performed, and the intensity of the thermal energy applied to the material. Because the material is constant and dependent upon design choices, the type of gas takes an extended period of time to change, and the thermal energy source is generally one that cannot be adjusted, changing these factors to produce an object with more desirable properties is difficult with current additive manufacturing systems.

SUMMARY

A system for additively manufacturing a three-dimensional object layer-by-layer includes a bed surface upon which the object is formed, a depositor configured to deposit material layer-by-layer on the bed surface or a previously deposited layer of the object to form the object, an energy source configured to selectively direct an energized beam at the material to form a melted pool of the material to fuse a new layer of the material to a previously formed layer, and a control apparatus configured to adjust the properties of a gas surrounding the material and through which the energized beam extends.

A method is disclosed for additive manufacturing a three-dimensional object layer-by-layer including depositing a layer of material on a bed surface or a previously deposited layer of the object to form the object layer-by-layer; providing energy to the material after each layer is deposited with the energy being provided by an energy source that forms an energized beam directed at the material; altering a property of a gas surrounding the material and through which the energized beam extends to alter a property of the object constructed from the material; melting the material with the energized beam to form a melted pool of liquefied material; and allowing the material to solidify to bond the material to a previous layer of material of the object.

DETAILED DESCRIPTION

An improved control apparatus and method for additively manufacturing a three-dimensional object layer-by-layer is disclosed herein. The method includes providing an electrical potential to gas in the additive manufacturing containment to adjust the location and diffusion of an energized beam used in the additive manufacturing process to melt a layer of deposited material. The electrical potential provided to the gas surrounding the energized beam alters the properties of the gas, which in turn alters the properties of the energized beam and the melting of the deposited material. The method can also include providing an electrical potential to a bed surface of the additive manufacturing apparatus and the deposited material to adjust the surface tension and other characteristics of a melted pool of material, such as the size and depth of the melted pool. Further, the electrical potential provided can be used to decrease oxides that may form on and/or within the deposited material during the melting/bonding process. The method can also include providing a magnetic field to an area surrounding the bed surface and the deposited material to adjust the characteristics of the gas and the deposited material. These adjustments to the properties of the energized beam, the melting of the deposited material, and the characteristics of the melted pool of material can be used to better control the additive manufacturing process to provide a finished object that has more desirable properties (e.g., increased strength, decreased porosity, etc.).

Figure 1:
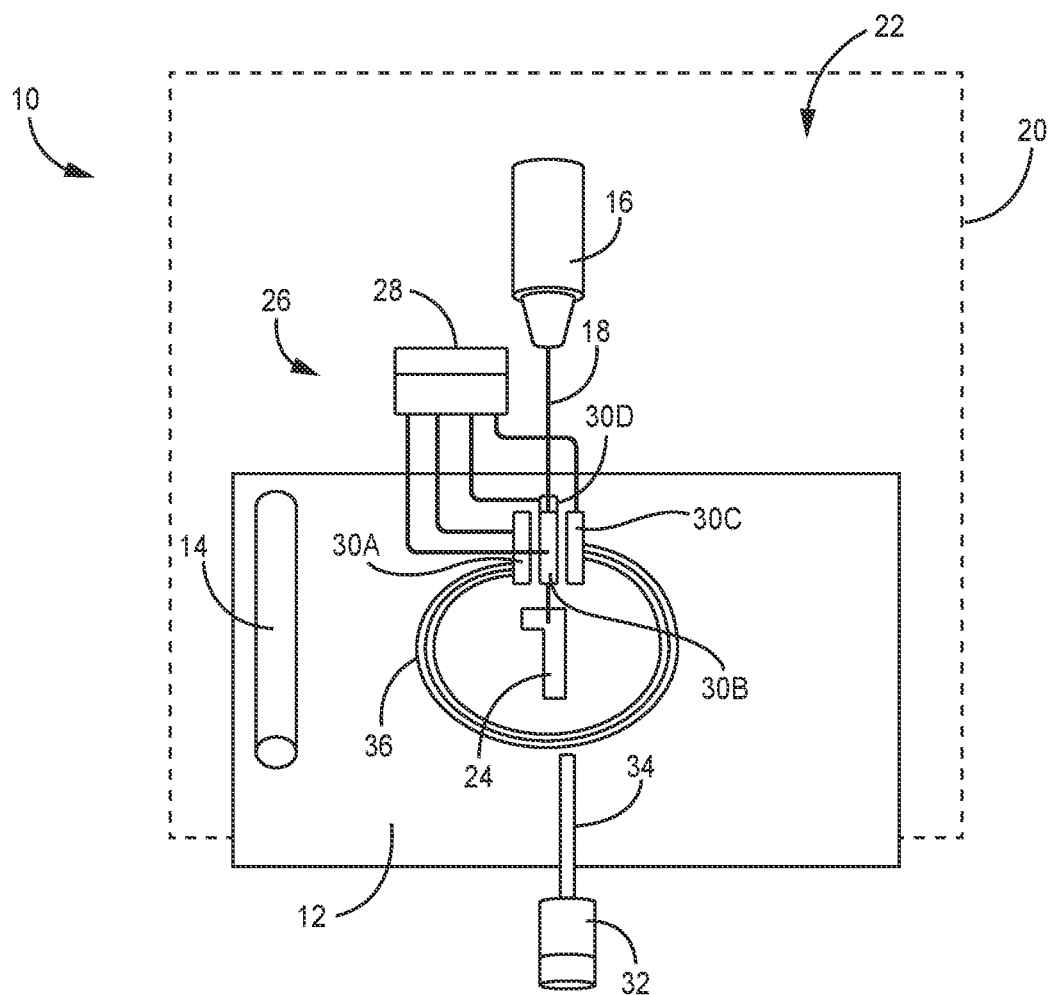
FIG. 1 is a perspective view of an additive manufacturing system with a control apparatus.

FIG. 1 is a perspective view of an additive manufacturing system with a control apparatus. Additive manufacturing system 10 includes bed surface 12, depositor 14, energy source 16 providing energized beam 18, and containment 20 housing gas 22. Object 24 is formed on bed surface 12 in a layer-by-layer process. Additive manufacturing system 10 also includes control apparatus 26, which includes first electrical potential source 28 in electrical communication with first lead 30A, second lead 30B, third lead 30C, and fourth lead 30D. Control apparatus 26 also includes second electrical potential source 32 in electrical communication with probe 34 and coil 36 for producing a magnetic field.

Additive manufacturing system 10 is configured to utilize powder bed fusion to construct three-dimensional object 24 by building object 24 layer-by-layer alternating between depositor 14 depositing material on bed surface 12 and energized beam 18 melting that deposited material to fuse/bond the deposited material to a previously formed layer of object 24. This process is performed within containment 20, which houses/contains gas 22. Gas 22 can be an inert gas (such as argon) so as to reduce the reactivity between gas 22 and the deposited material/object 24 during the additive manufacturing process. As will be discussed below, the properties of gas 22 can be altered by control apparatus 26. These properties can be the density, purity, electrical charge, etc.

Aside from control apparatus 26, most components of additive manufacturing system 10 operate generally as understood in the art. Bed surface 12 is a platform (which can be flat, ridged, or have another configuration) that provides a surface upon which object 24 is formed layer-by-layer during the additive manufacturing process. Depositor 14 is an apparatus configured to deposit material layer-by-layer on bed surface 12 and/or the previously deposited and formed layer of object 24. Depositor 14 can be a roller, a moveable duct, or another configuration that deposits material. The material deposited by depositor 14 can be a powder or another material from which object 24 is constructed. In powder bed fusion additive manufacturing, the deposited material is a powder that is then melted into a liquid before solidifying as solid object 24. For example, the material forming object 24 can be a metal, a composite, or another material able to be used in additive manufacturing. Energy source 16 can be any component configured to produce energized beam 18, which can be a laser, to melt the material deposited on object 24 to form a melt pool. Energized beam 18 is a path between energy source 16 and the deposited material/object 24 along which thermal energy travels. The melt pool is an area of the deposited material and of object 24 that has been liquefied by the thermal energy introduced by energized beam 18 and, when allowed to melt and solidify, bonds/fuses the layer of deposited material to the previously deposited layers to form object 24. Energy source 16 and/or energized beam 18 can be mobile relative to bed surface 12 to adjust the location at which energized beam 18 contacts the deposited material/object 24 (or, vice versa, bed surface 12 can be mobile relative to energy source 16 and/or energized beam 18).

Because the material used to construct object 24, gas 22 within containment 20, and the intensity of energized beam 18 are not easily adjustable in prior art additive manufacturing systems, additive manufacturing system 10 cannot otherwise be adjusted to construct object 24 with more desirable properties. Thus, control apparatus 26 allows for adjustment of the additive manufacturing process to alter object 24 to have more desirable properties.

Control apparatus 26 includes numerous components able to adjust the properties of energized beam 18, the melting of object 24 and the deposited material, the surface tension of the melted pool of material, and the oxides that can develop on object 24 during the additive manufacturing process. These properties are adjusted using electrical potential (relative to object 24/*the* deposited material) provided to gas 22 through which energized beam 18 extends and in which object 24 is present. The electrical potential is provided to gas 22 by first electrical potential source 28 in electrical communication with first lead 30A, second lead 30B, third lead 30C, and fourth lead 30D (collectively, "leads 30A-30D"). These properties are also adjusted using electrical potential (relative to ground) provided to bed surface 12 by second electrical potential source 32 in electrical communication with probe 34. These properties are also adjusted using a magnetic field provided around bed surface 12, the deposited material, and object 24 by coil 36. These components are described in greater detail below.

The electrical potential can be potential that is relative to ground with bed surface 12 electrically connected to the ground and, if desired, the deposited material/object 24 electrically connected to bed surface 12 such that the deposited material/object 24 is also grounded. Thus, using an electrical potential relative to bed surface 12 and/or the deposited material/object 24 can be either an electrical potential relative to ground or an electrical potential relative to the electrical state of bed surface 12 and/or the deposited material/object 24.

First electrical potential source 28 can be any component (or multiple components) configured to create an electrical potential relative to ground or another reference point, such as an electricity source (which can be a battery, an electrical grid, etc.). First electrical potential source 28 can be configured to adjust the electrical potential as desired to adjust the additive manufacturing process (e.g., the properties of gas 22 and object 24/the deposited material). First electrical potential source 28 provides electrical potential to leads 30A-which are positioned to surround energized beam 18 as energized beam 18 extends between energy source 16 and object 24 being formed on bed surface 12. Leads 30A-30D are spaced around energized beam 18 to introduce the electrical potential to gas 22 at various locations adjacent energized beam 18 to control/alter energized beam 18. Depending on how much electrical potential is introduced by each of leads 30A-30D, a location and intensity of energized beam 18 that contacts object 24 can be adjusted. For example, if first lead 30A is the only lead providing electrical potential to gas 22 adjacent energized beam 18, energized beam 18 may deflect slightly towards or away from lead 30A, which alters the location where energized beam 18 contacts the deposited material forming object 24. Further, energized beam 18 may not diffuse as much adjacent lead 30A (with relation to the rest of energized beam 18), which can alter the intensity of a portion of energized beam 18 nearest lead 30A. The increase or decrease in intensity can modify the size and/or depth of the melted pool of deposited material. Further, leads 30A-30D can be positioned and configured to reduce/remove oxides that can form on the surface of the deposited material/object 24 during the melting and bonding process, thereby decreasing the porosity of object 24 and increasing strength.

While control apparatus 26 is shown as having four leads 30A-30D spaced equally around energized beam 18 (thus, 90 degrees apart) to circumferentially encircle energized beam 18 and at an equal distance above bed surface 12, control apparatus 26 can include any number of leads spaced any distance circumferentially from one another and/or from bed surface 12. For example, control apparatus 26 could include eight leads: four leads spaced circumferentially equal from one another and a distance from bed surface 12, and four lead spaced circumferentially unequal from one another and a distance from bed surface 12 that is smaller than the other four leads. Leads 30A-30D can be any electrical components configured to introduce an electrical potential to gas 22 within containment 20. Leads 30A-30D can include additional features, such as mounts that allow for the adjustment of the physical location of each lead.

Like first electrical potential source 28, second electrical potential source 32 can be any component (or multiple components) configured to create an electrical potential, such as an electricity source, and can be able to adjust the electrical potential as desired to adjust the additive manufacturing process (e.g., the size, depth, and surface tension of the melted pool of deposited material forming object 24). While first electrical potential source 28 and second electrical potential source 32 are shown as two different components in FIG. 1, first electrical potential source 28 and second electrical potential source 32 can be the same component/source for providing electrical current/potential. Second electrical potential source 32 provides electrical potential to probe 34, which can be a lead similar to leads 30A-30D or another component configured to introduce electrical potential (relative to ground or another benchmark) to bed surface 12 and object 24. The electrical potential provided by probe 34 to bed surface 12 and the deposited material/object 24 can modify the properties of object 24 during construction/formation to produce object 24 with more desirable properties.

While control apparatus 26 is shown as having one probe 34, control apparatus 26 can include any number of probes located anywhere adjacent or within bed surface 12 to modify the properties of object 24 during and after material is being deposited and energized beam 18 is melting and bonding the deposited material to object 24. Further, probe 34 can include additional features, such as mounts that allow for the adjustment of the physical location of probe 34 relative to bed surface 12 and/or object 24.

Coil 36 can be any component (or multiple components) configured to create a magnetic field adjacent bed surface 12 surrounding the deposited material, object 24, and/or energized beam 18. Coil 36 can be an electrical wire that winds around object 24 and the deposited material or another configuration for providing a magnetic field. Coil 36 can be provided electrical current by second electrical potential source 32 or another electricity source to generate the magnetic field. Additionally, coil 36 can be configured to provide a magnetic field around energized beam 18. For example, coil 36 can wind to a height so as to surround leads 30A-30D. The electrical current through coil 36 can be adjusted to increase or decrease the strength/intensity of the magnetic field depending on the desired properties of object 24 and other design considerations. The magnetic field generated by coil 36 can alter the intensity of a portion of energized beam 18, reduce/remove oxides that can form on the surface of the deposited material/object 24, and/or alter the surface tension and other properties of the melted pool/deposited material/object 24.

As stated above, control apparatus 26 (first electrical potential source 28, leads 30A-30D, second electrical potential source 32, probe 34, and coil 36) is configured to provide electrical potential (relative to bed surface 12, object 24, and/or ground, depending on where the potential is introduced) and/or a magnetic field. The electrical potential and/or magnetic field can be provided to (or be generated to surround) gas 22, object 24, the deposited material, and/or bed surface 12 to alter the properties of gas 22 and/or the material deposited to form object 24 to adjust the properties of the finished object 24. Control apparatus 26 can adjust a location (by deflecting energized beam 18), intensity (be increasing or decreasing the diffusion), size (i.e., surface area), and depth of energized beam 18 contacting the deposited material/object 24. Further, control apparatus 26 can adjust a surface tension of the melted pool of deposited material as well as remove oxides that can form on or within object 24 during/after the additive manufacturing process. This additive manufacturing process incorporating the use of electrical potential is described below.

Figure 2:
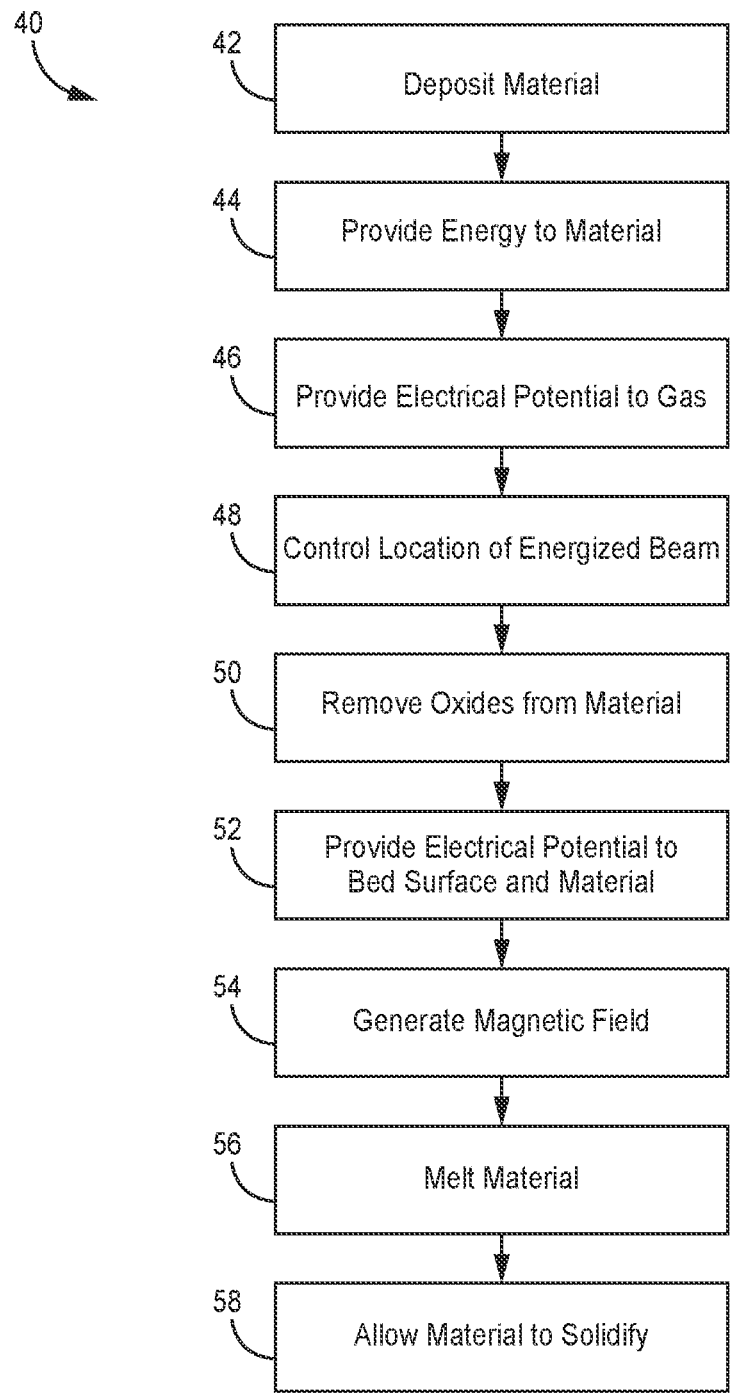
FIG. 2 is a flow chart of an additive manufacturing process incorporating an improved control process.

FIG. 2 is a flow chart of an improved additive manufacturing process using electrical potential introduced at various locations and to various components of additive manufacturing system 10. Process 40 includes multiple steps 42-58 to construct object 24 layer-by-layer to form object 24 with more desirable properties. Process 40 will also be described with regards to components shown in FIG. 1.

Step 42 is depositing a layer of material (i.e., the deposited material) used to construct object 24 on bed surface 12 (or a previously deposited portion of object 24) to from object 24 layer-by-layer. The material can be deposited using depositor 14, and the amount of material deposited at each specified location can vary depending on design considerations and other factors. The depositing of material, with various different configurations and sub-steps, is known to one of skill in the art.

After each layer of the material is deposited, step 44 includes providing energy to the layer of the material by energy source 16 through the use of energized beam 18 directed at the deposited material.

While energized beam 18 (and energy source 16) can be turned on and off and directed at different locations of the deposited material/object 24, small adjustments (i.e., fine tuning) of the intensity and location of energized beam 18 is difficult. Thus, control apparatus 26 can be used for small adjustments to energized beam 18 by modifying the property of gas 22 through which energized beam 18 extends before contacting the deposited material/object 24. Thus, step 46 includes providing an electrical potential to gas 22 in containment 20 (with gas 22 surrounding energized beam 18, the deposited material/object 24, etc.). The electrical potential provided to gas 22 can be relative to ground, bed surface 12, and/or the deposited material/object 24 depending on, among other things, whether bed surface 12 is grounded. The electric potential is proved by at least one of leads 30A-30D and modifies the properties of gas 22.

After providing the electrical potential to gas 22, leads 30A-30D can be used to control a location that energized beam 18 contacts the deposited material/object 24 (step 48). Lead 30A-30D can each individually/independently be turned on and off and the electrical potential provided to gas 22 by each of leads 30A-30D can be increased or decreased to adjust/fine tune the location that energized beam 18 contacts the deposited material/object 24. Further, the electrical potential provided to gas 22 can reduce an amount of diffusion energized beam 18 experiences between energy source 16 and the deposited material/object 24 to modify the size and depth of the melted pool (and the cross-sectional area of energized beam 18).

Before, after, or during steps 48, 52, and 54, step 50 can be performed. Step 50 includes reducing (or completely removing) oxides that form on the liquefied material/object 24 during and after process 40 using the electrical potential provided to gas 22 and/or to the liquefied deposited material/object 24. The electrical potential can be introduced near a surface of the liquefied deposited material/object 24 to attract or repel the oxides that can form during the melting and solidifying steps (steps 56 and 58 detailed below).

Also performed before, during, or after steps 48, 50, and 54, electrical potential can also be provided to bed surface 12 and/or the deposited material forming object 24 (step 52). This electrical potential can be provided by second electrical potential source 32 and probe 34. The electrical potential provided to bed surface 12 and/or the deposited material can modify a surface tension of the melted pool of deposited material, thereby altering the size, depth, and/or other characteristics of the melted pool, which in turn can modify/adjust the properties of object 24 after the melted pool is allowed to solidify (step 58 below). Providing electrical potential to bed surface 12 and/or the deposited material can also reduce/remove oxides that form on the liquefied deposited material/object 24. Thus, the performance of step 52 may also include the performance of step 50.

Also performed before, during, or after steps 46-52, a magnetic field can be generated by coil 36 to surround the deposited material, object 24, and/or energized beam 18. The magnetic field can align or misalign atoms/molecules in gas 22, the deposited material, and/or object 24 to alter the characteristics of those materials/substances. The magnetic field can modify a surface tension of the melted pool of deposited material, thereby altering the size, depth, and/or other characteristics of the melted pool, which in turn can modify/adjust the properties of object 24 after the melted pool is allowed to solidify (step 58 below). Further, the magnetic field can adjust the intensity of energized beam 18 as well as reduce/remove oxides that can form on the liquefied deposited material/object 24.

Step 56 includes melting deposited material with energized beam 18 to form a melted pool of liquefied material and a portion of object 24 that has been melted. As discussed above, step 56 can be performed before, during, or after any of steps 46-54. In powder bed fusion, the most recently deposited material layer is melted along with a portion of the previously deposited layers (that have previously been melted and solidified) forming object 24. Often times, process 40 may be configured such that step 56 is performed before steps 46-54.

Finally, the melted pool (which includes the liquefied deposited material and at least a portion of the previously deposited and previously solidified layers of object 24) is allowed to solidify to bond/fuse the material to the previous layers of object 24 (step 58). Then, if necessary, process 40 is performed again to form another layer of object 24 upon the previously deposited layer.

Control apparatus 26 in additive manufacturing system 10 and process 40 for additively manufacturing three-dimensional object 24 layer-by-layer is disclosed herein. Process includes providing an electrical potential to gas 22 in the additive manufacturing containment to adjust the location and diffusion of energized beam 18 used in process 40 to melt a layer of deposited material. The electrical potential provided to gas 22 alters the properties of gas 22, which in turn alters the properties of energized beam 18 and the melting of the deposited material. Process 40 can also include providing an electrical potential to bed surface 12 and the deposited material/object 24 to adjust the surface tension and other characteristics of the melted pool of material, such as the size and depth of the melted pool. Further, the electrical potential provided can be used to decrease oxides that can form on and/or within the deposited material during the melting/bonding process. Process 40 can also include providing a magnetic field to the area surround bed surface 12, energized beam 18, the deposited material, and/or object 24 to adjust the characteristics of gas 22, the deposited material, and object 24. These adjustments to the properties of energized beam 18, the melting of the deposited material, and the characteristics of the melted pool of material can be used to better control the additive manufacturing process 40 to provide finished object 24 that has more desirable properties (e.g., increased strength, decreased porosity, etc.).

Because the material used to construct object 24, gas 22 within containment 20, and the intensity of energized beam 18 are not easily adjustable in prior art additive manufacturing systems, the properties of object 24 cannot otherwise be adjusted to construct object 24 with more desirable properties. Thus, control apparatus 26 allows for adjustment of the additive manufacturing process to alter object 24 to have more desirable properties.

Discussion of Possible Embodiments

The following are non-exclusive descriptions of possible embodiments of the present invention.

A system for additively manufacturing a three-dimensional object layer-by-layer includes a bed surface upon which the object is formed, a depositor configured to deposit material layer-by-layer on the bed surface or a previously deposited layer of the object to form the object, an energy source configured to selectively direct an energized beam at the material to form a melted pool of the material to fuse a new layer of the material to a previously formed layer, and a control apparatus configured to adjust the properties of a gas surrounding the material and through which the energized beam extends.

The system of the preceding paragraph can optionally include, additionally and/or alternatively, any one or more of the following features, configurations and/or additional components:

The control apparatus includes at least one lead positioned adjacent the energized beam and the bed surface, the at least one lead being configured to provide an electrical potential to alter the properties of the gas in which the material is present and through which the energized beam extends.

The at least one lead includes four leads positioned 90 degrees apart to encircle the energized beam.

The four leads can be adjusted independently from one another to control a location of the energized beam.

The control apparatus alters the properties of the gas to alter an amount of diffusion the energized beam experiences between the energy source and the material to modify a depth of the melted pool.

The control apparatus alters the properties of the gas to remove oxides that form on the material during the additive manufacturing process.

The control apparatus includes a probe configured to introduce an electrical potential onto the bed surface and the material deposited on the bed surface relative to ground.

The introduction of the electrical potential onto the bed surface and the material decreases the surface tension of the melted pool of the material.

The control apparatus includes a coil adjacent the bed surface and winding to surround the material, the coil being configured to generate a magnetic field in an area surrounding the material to adjust the properties of the gas and the material.

Electrical current flows through the coil to generate the magnetic field.

The gas is argon.

A method is disclosed for additive manufacturing a three-dimensional object layer-by-layer including depositing a layer of material on a bed surface or a previously deposited layer of the object to form the object layer-by-layer; providing energy to the material after each layer is deposited with the energy being provided by an energy source that forms an energized beam directed at the material; altering a property of a gas surrounding the material and through which the energized beam extends to alter a property of the object constructed from the material; melting the material with the energized beam to form a melted pool of liquefied material; and allowing the material to solidify to bond the material to a previous layer of material of the object.

The method of the preceding paragraph can optionally include, additionally and/or alternatively, any one or more of the following features, configurations, steps, and/or additional components:

The step of altering a property of the gas includes providing an electrical potential to the gas surrounding the energized beam and the material to alter the properties of the gas, the energized beam, and the material.

Providing the electrical potential to the gas includes providing an electrical charge to at least one lead positioned adjacent to the energized beam.

The at least one lead includes four leads and the method further includes controlling a location that the energized beam contacts the material by adjusting the electrical potential introduced by each of the four leads.

Providing an electrical potential to the gas surrounding the energized beam and the material alters an amount of diffusion the energized beam experiences to modify a depth of the melted pool of the material.

Providing an electrical potential to the bed surface and the material deposited on the bed surface to alter a surface tension of the melted pool of material.

The electrical potential provided to the bed surface and the material decreases the surface tension of the melted pool of material.

Generating a magnetic field that surrounds the material to alter a property of the gas and the material.

Removing oxides that form on the material during the additive manufacturing process by altering the property of the gas surrounding the material.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for additively manufacturing a three-dimensional object layer-by-layer comprising:
    a bed surface;
    the object formed upon the bed surface and constructed from a material;
    a depositor configured to deposit the material layer-by-layer on the bed surface or a previously deposited layer of the object;
    an energy source configured to selectively direct an energized beam at the material to fuse a new layer of the material to a previously formed layer;
    a gas surrounding the material through which the energized beam extends;
    a control apparatus configured to adjust properties of the gas; and
    a melted pool of the material that has a depth that is modified by the control apparatus adjusting the properties of the gas to alter an amount of diffusion the energized beam experiences in order to change a property of the object constructed from the material.

2. The system of claim 1, wherein the control apparatus comprises:
    at least one lead positioned adjacent the energized beam and the bed surface, the at least one lead being configured to provide an electrical potential to alter the properties of the gas in which the material is present and through which the energized beam extends.

3. The system of claim 2, wherein the at least one lead includes four leads positioned 90 degrees apart to encircle the energized beam.

4. The system of claim 3, wherein the four leads can be adjusted independently from one another to control a location of the energized beam.

5. The system of claim 1, wherein the control apparatus alters the properties of the gas to remove oxides that form on the material during the additive manufacturing process.

6. The system of claim 1, wherein the control apparatus comprises:
    a probe configured to introduce an electrical potential onto the bed surface and the material deposited on the bed surface relative to ground.

7. The system of claim 6, wherein the introduction of the electrical potential onto the bed surface and the material decreases the surface tension of the melted pool of the material.

8. The system of claim 1, wherein the control apparatus comprises:
    a coil adjacent the bed surface and winding to surround the material, the coil being configured to generate a magnetic field in an area surrounding the material to adjust the properties of the gas and the material.

9. The system of claim 8, wherein electrical current flows through the coil to generate the magnetic field.

10. The system of claim 1, wherein the gas is argon.

* * * * *